US012542339B2

(12) United States Patent
Kim et al.

(10) Patent No.: US 12,542,339 B2
(45) Date of Patent: Feb. 3, 2026

(54) WIDEBAND SEPTUM POLARIZER FOR REDUCING HIGHER ORDER MODE

(71) Applicant: INTELLIAN TECHNOLOGIES, INC., Pyeongtaek (KR)

(72) Inventors: Hyun Soo Kim, Ansan (KR); Griogair Whyte, Larbert (GB)

(73) Assignee: INTELLIAN TECHNOLOGIES, INC., Pyeongtaek (KR)

( * ) Notice: Subject to any disclaimer, the term of this patent is extended or adjusted under 35 U.S.C. 154(b) by 0 days.

(21) Appl. No.: 18/024,190

(22) PCT Filed: Nov. 2, 2021

(86) PCT No.: PCT/KR2021/015654

§ 371 (c)(1),
(2) Date: Jul. 24, 2023

(87) PCT Pub. No.: WO2022/050828

PCT Pub. Date: Mar. 10, 2022

(65) Prior Publication Data

US 2024/0275007 A1 Aug. 15, 2024

(51) Int. Cl.

*H01P 1/165* (2006.01)
*H01P 1/213* (2006.01)

(52) U.S. Cl.

CPC ............ *H01P 1/165* (2013.01); *H01P 1/2131* (2013.01)

(58) Field of Classification Search

CPC .......... H01P 1/165; H01P 1/171; H01P 1/173; H01P 1/162; H01P 1/2131; H01P 1/2136

USPC ............ 333/21 A, 21 R, 137, 157, 156, 161; 343/756

See application file for complete search history.

(56) References Cited

U.S. PATENT DOCUMENTS 9,478,838 B2 * 10/2016 Wolf ...................... H01P 1/171
2015/0357695 A1 12/2015 Hagensen

FOREIGN PATENT DOCUMENTS

| | | |
|---|---|---|
| JP | 2007329741 | 12/2007 |
| JP | 2017152938 | 8/2017 |
| KR | 101228014 | 2/2013 |
| KR | 101482533 | 1/2015 |
| WO | 2012061881 | 5/2012 |
| WO | 2016143094 A1 | 9/2016 |

* cited by examiner

*Primary Examiner* — Jorge L Salazar, Jr.
(74) *Attorney, Agent, or Firm* — Boyle Fredrickson, S.C.

(57) ABSTRACT

A septum polarizer according to one embodiment can comprise a waveguide body and a stair-shaped septum, which is arranged in the longitudinal direction inside the waveguide body and divides the waveguide body into two parts, and has stepped parts of different heights so that a higher order mode can be reduced in a preset frequency band. In addition, a septum polarizer according to one embodiment can comprise: a waveguide body having a polygonal cross-section; a stair-shaped septum, which is arranged in the longitudinal direction inside the waveguide body and divides the waveguide body into two parts; and a pleated part arranged on the outer surface of the waveguide body, and thus a higher order mode can be reduced in a preset frequency band.

10 Claims, 5 Drawing Sheets

WIDEBAND SEPTUM POLARIZER FOR REDUCING HIGHER ORDER MODE

TECHNICAL FIELD

The present disclosure discloses a wideband septum polarizer for reducing a higher order mode (HOM) in a preset frequency band. Specifically, a wideband septum polarizer for reducing an HOM that guarantees a smooth communication characteristic by reducing or suppressing an HOM, such as TM11 and TE11, that occurs in a relatively higher frequency band among using frequency bands.

BACKGROUND ART

Polarization is a phenomenon in which an electric field vibrates in a predetermined direction in an electromagnetic wave, and the electric field not only vibrates in a one-dimensional linear direction but also rotates. An electromagnetic wave is a type of wave that is propagated while an electric field and a magnetic field vibrate. The directions in which the electric field and the magnetic field vibrate are perpendicular to the traveling direction of the electromagnetic wave.

A polarizer is an electromagnetic passive element that responds to and absorbs only components that vibrate in the same direction in an incident electromagnetic wave and lets other components pass through.

A septum polarizer, which uses circular polarization, is a key part of a communication antenna. The septum polarizer is widely used because it is compact, inexpensive to manufacture, and has an excellent axial ratio characteristic.

U.S. Patent Publication No. 2019-0190161 entitled "INTEGRATED TRACKING ANTENNA ARRAY" published on Jun. 20, 2019 discloses an integrated tracking antenna array.

The above description is information the inventor(s) acquired during the course of conceiving the present disclosure, or already possessed at the time, and was not necessarily publicly known before the present application was filed.

DISCLOSURE OF THE INVENTION

Technical Goals

An embodiment provides a wideband septum polarizer for reducing an higher order mode (HOM) that guarantees a smooth communication characteristic by reducing or suppressing an HOM, such as TM11 and TE11, that occurs in a relatively higher frequency band than a lower frequency band (in general, a lower frequency band of a satellite earth station antenna is used as a receiving band and a relatively higher frequency band is used as a transmitting band), when Ka-Band satellite communication, which is representative wideband communication, is performed.

An embodiment provides a wideband septum polarizer for reducing an HOM that may reduce adjacent satellite interference caused by a sidelobe and prevent reduction in antenna gain due to an HOM by reducing distortion of Co-pol and Cross-pol beam patterns of an antenna and increasing symmetry by suppressing an HOM of the septum polarizer.

An embodiment provides a wideband septum polarizer for reducing an HOM that reduces an HOM without deterioration of characteristics of a default mode such as an axial ratio and isolation.

The technical goals obtainable from the embodiments are not limited to the above-mentioned technical goals, and other unmentioned technical goals may be clearly understood from the following description by those having ordinary skill in the technical field to which the present disclosure pertains.

Technical Solutions

According to an aspect, a septum polarizer according to an embodiment may include a waveguide body and a stepped septum disposed in a longitudinal direction inside the waveguide body and configured to divide the waveguide body into two parts and may include stepped portions of different heights to reduce a higher order mode in a preset frequency band.

The septum may include a first stepped portion disposed on a front side of the waveguide body, a second stepped portion disposed behind the first stepped portion and configured to reduce a higher order mode, and a third stepped portion disposed behind the second stepped portion and disposed to face the first stepped portion.

The first stepped portion may include at least one step, and steps of the first stepped portion may be formed with different heights and arranged from front to back in an increasing order of step heights.

The second stepped portion may have a higher height than the first stepped portion, at least one pair of steps may be provided to form the second stepped portion, the pair of steps may include at least two steps of different heights, and among the at least two steps, a step with a higher height may be disposed before a step with a lower height.

The second stepped portion may include a first pair of steps disposed on a front side of the second stepped portion, a second pair of steps disposed behind the first pair of steps, and a third pair of steps disposed behind the second pair of steps, wherein an average height of the first pair of steps may be lower than an average height of the second pair of steps, and the average height of the second pair of steps may be lower than an average height of the third pair of steps.

The third stepped portion may be configured to have a higher height than the second stepped portion, at least one step may be provided to form the third stepped portion, and steps of the third stepped portion may be arranged from front to back in an increasing order of step heights.

According to an embodiment, a septum polarizer may include a waveguide body having a polygonal cross-section, a stepped septum disposed in a longitudinal direction inside the waveguide body and configured to divide the waveguide body into two parts, and a corrugated portion disposed on outer surface of the waveguide body, wherein the septum polarizer may reduce a higher order mode in a preset frequency band.

The corrugated portion may be disposed on a surface of the waveguide body outside the septum and disposed on a surface of the waveguide body that does not meet the septum.

The septum may include n steps of different heights, and the corrugated portion may include n+1 steps.

Neighboring steps of the corrugated portion may be formed with different heights, widths, or depths.

Effects

By using a septum polarizer for reducing a higher order mode (HOM) according to an embodiment, it may be possible to guarantee a smooth communication characteristic by reducing or suppressing an HOM (for example, TM11 and TE11 for a square waveguide, or TM01 and TE21 for a circular waveguide) that occurs in a relatively higher frequency band rather than a lower frequency band (in general, a lower frequency band of a satellite earth station antenna is used as a receiving band and a relatively higher frequency band is used as a transmitting band) when Ka-Band satellite communication, which is representative wideband communication, is performed.

By using the septum polarizer for reducing an HOM according to an embodiment, it may be possible to reduce adjacent satellite interference caused by a sidelobe and prevent reduction in antenna gain due to an HOM by reducing distortion of Co-pol and Cross-pol beam patterns of an antenna and increasing symmetry by suppressing an HOM of the septum polarizer.

By using the septum polarizer for reducing an HOM according to an embodiment, it may be possible to reduce an HOM without deterioration of characteristics of a default mode such as an axial ratio and isolation.

The effects of the wideband septum polarizer for reducing an HOM according to an embodiment may not be limited to the above-mentioned effects, and other unmentioned effects may be clearly understood from the following description by one of ordinary skill in the art.

Figure 1:
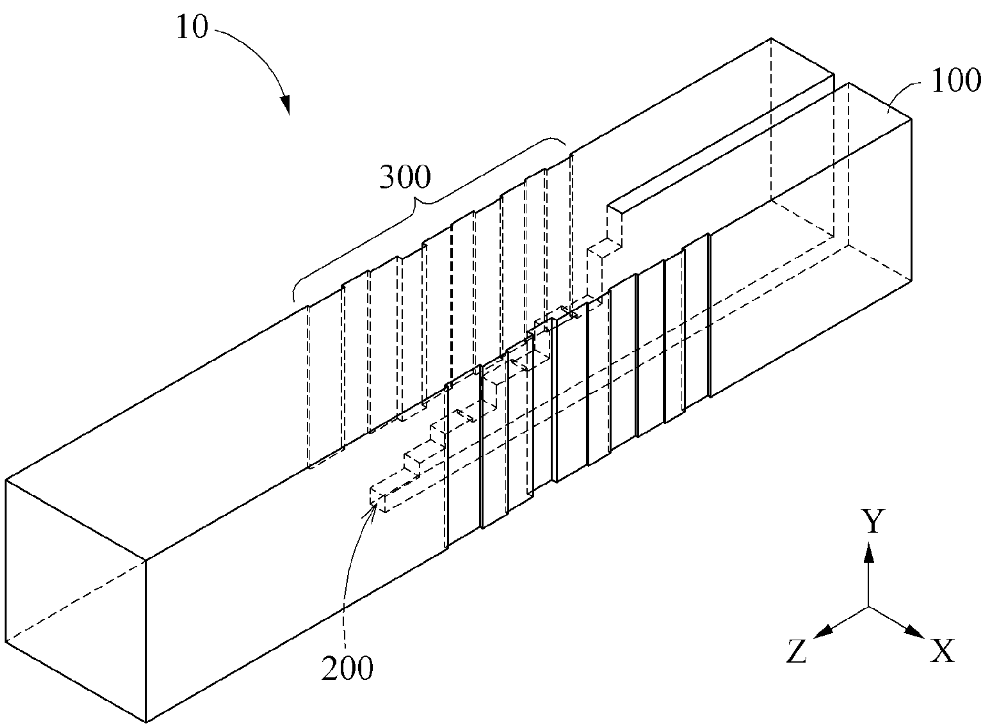
FIG. 1 is a perspective view of a septum polarizer according to an embodiment.

The accompanying drawings illustrate desired embodiments of the present disclosure and are provided together with the detailed description for better understanding of the technical idea of the present disclosure. Therefore, the present disclosure should not be construed as being limited to the embodiments set forth in the drawings.

BEST MODE FOR CARRYING OUT THE INVENTION

Hereinafter, embodiments are described in detail with reference to the accompanying drawings. However, various alterations and modifications may be made to the embodiments. Here, the embodiments are not meant to be limited by the descriptions of the present disclosure. The embodiments should be understood to include all changes, equivalents, and replacements within the idea and the technical scope of the disclosure.

The terminology used herein is for the purpose of describing particular embodiments only and is not to be limiting of the embodiments. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, components, or combinations thereof, but do not preclude the presence or addition of one or more of other features, integers, steps, operations, elements, components, or combinations thereof.

Unless otherwise defined, all terms including technical and scientific terms used herein have the same meaning as commonly understood by one of ordinary skill in the art to which the embodiments belong. Terms defined in dictionaries generally used should be construed to have meanings matching with contextual meanings in the related art and are not to be construed as having an ideal or excessively formal meaning unless otherwise defined herein.

In the descriptions of the embodiments referring to the accompanying drawings, like reference numerals refer to like elements and any repeated description related thereto will be omitted. In the description of the embodiments, detailed description of well-known related structures or functions will be omitted when it is deemed that such description will cause ambiguous interpretation of the present disclosure.

In addition, terms such as first, second, A, B, (a), (b), and the like may be used to describe components of the embodiments. These terms are used only for the purpose of discriminating one component from another component, and the nature, the sequences, or the orders of the components are not limited by the terms. It is to be understood that if a component is described as being "connected," "coupled" or "joined" to another component, the former may be directly "connected," "coupled," and "joined" to the latter or "connected", "coupled", and "joined" to the latter via another component.

Components included in an embodiment and components having a common function are described using the same names in other embodiments. Unless stated otherwise, the description of an embodiment may be applicable to other embodiments, and a repeated description related thereto is omitted.

Figure 2:
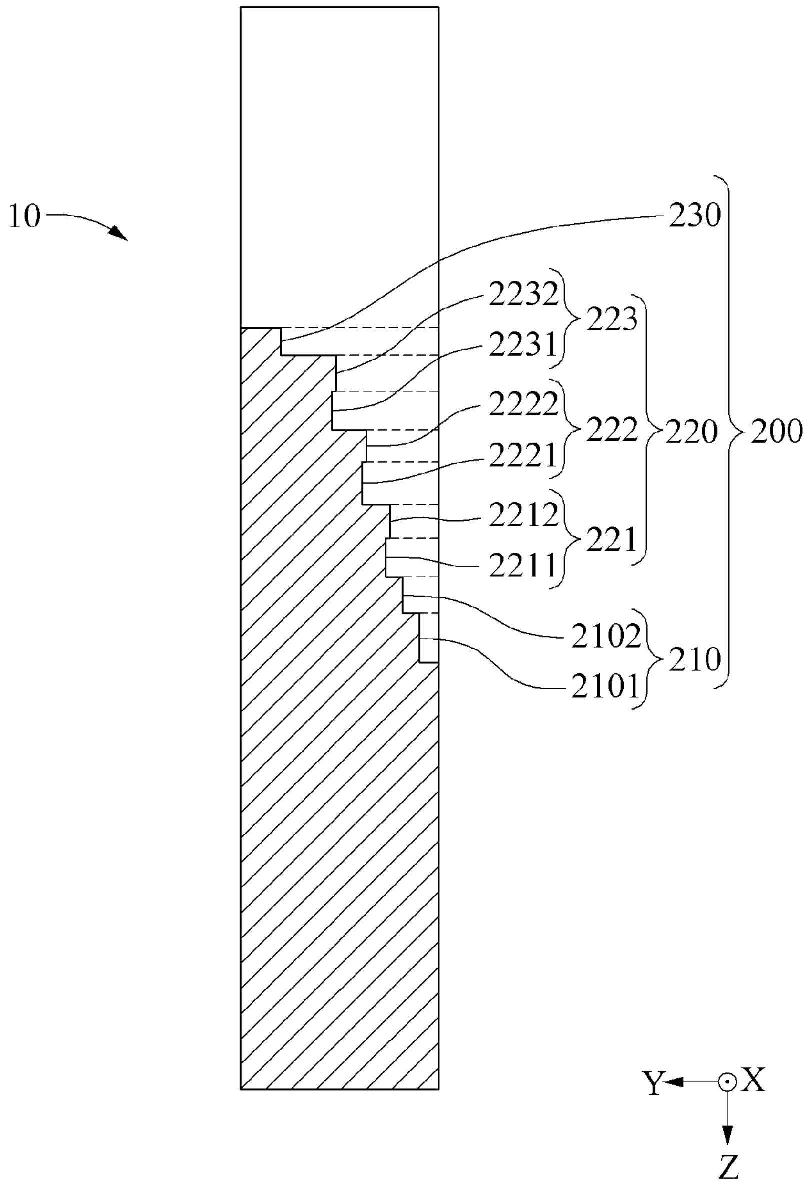
FIG. 2 is a cross-sectional view of a septum polarizer according to an embodiment.
Figure 3:
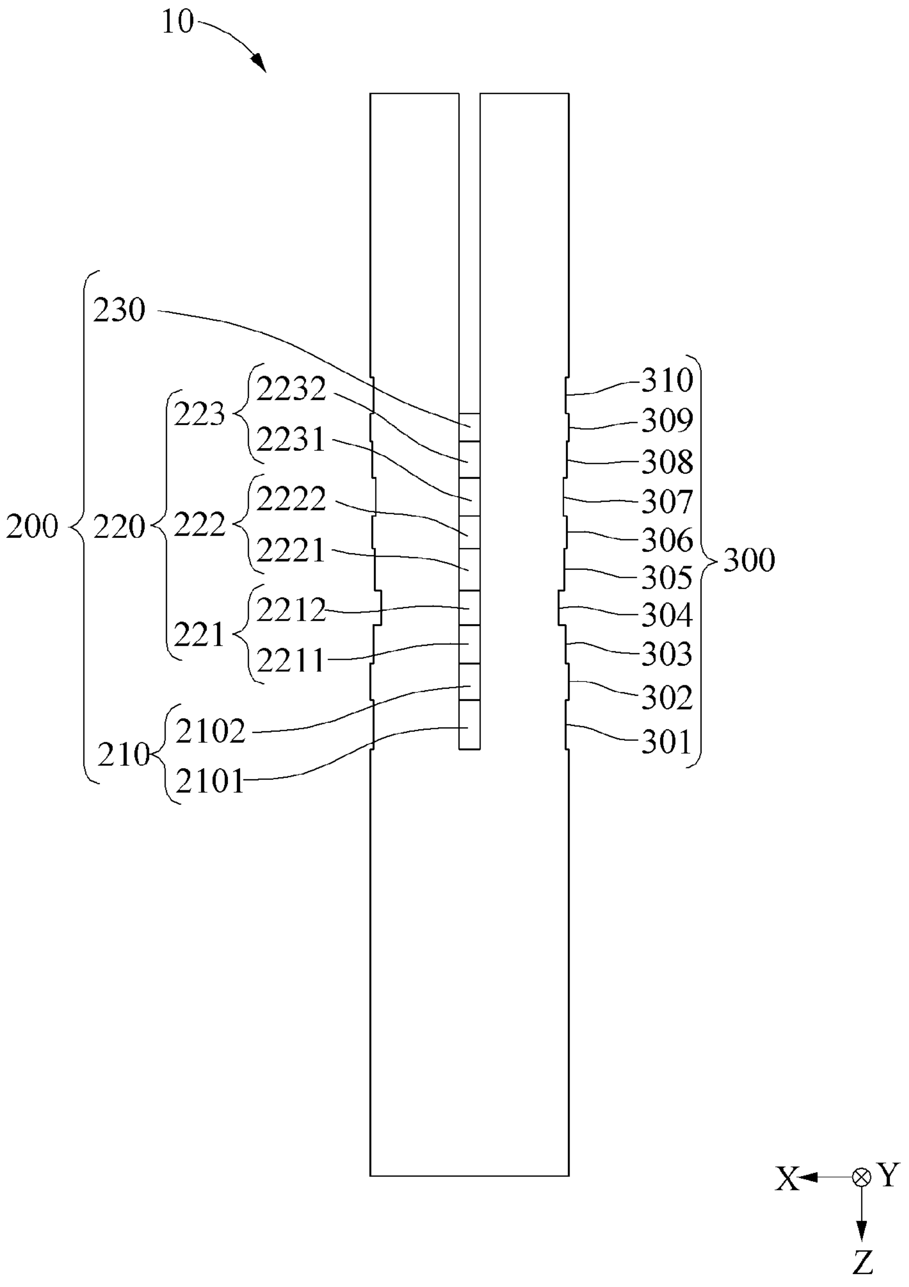
FIG. 3 is a bottom view of a septum polarizer according to an embodiment.

FIG. 1 is a perspective view of a septum polarizer 10 according to an embodiment, FIG. 2 is a cross-sectional view of the septum polarizer 10 according to an embodiment, and FIG. 3 is a bottom view of the septum polarizer 10 according to an embodiment.

Referring to FIGS. 1 and 2, the septum polarizer 10 according to an embodiment may include a waveguide body 100, a stepped septum 200 disposed in a longitudinal direction inside the waveguide body 100 and configured to divide the waveguide body 100 into two parts. A shape of the waveguide body 100 may be a square pillar, a cylinder, or a polygonal prism, and is not limited to any shape.

The septum 200 may include a first stepped portion 210 disposed on a front side of the waveguide body 100, a second stepped portion 220 disposed behind the first stepped portion 210 and configured to reduce a higher order mode (HOM), and a third stepped portion 230 disposed behind the second stepped portion 220 and disposed to face the first stepped portion 210. The front side of the waveguide body 100 may be a side close to a positive direction of a Z-axis in a coordinate system, and a rear side or back side of the waveguide body 100 may be a side close to a negative direction of the Z-axis. The entire septum 200 may be positioned on the rear side of the waveguide body 100, or the septum 200 may serve as a septum (dividing wall) that divides the rear side of the waveguide body 100 into two parts.

As illustrated in FIG. 1 or FIG. 2, the first stepped portion 210 may include at least one step, and steps of the first stepped portion 210 may be formed with different heights and arranged from front to back in an increasing order of step heights. In FIG. 2, the first stepped portion 210 may include a first step 2101 and a second step 2102, and the second step 2102 may be formed to have a higher height than the first step 2101. The first stepped portion 210 includes two steps but may also include one or more steps.

The second stepped portion 220 may have a higher height than the first stepped portion 210, at least one pair of steps may be provided to form the second stepped portion, the pair of steps may include at least two steps of different heights, and among the at least two steps, a step with a higher height may be disposed before a step with a lower height. As illustrated in FIG. 2, the second stepped portion 220 may include a first pair of steps 221 disposed on a front side of the second stepped portion, a second pair of steps 222 disposed behind the first pair of steps 221, and a third pair of steps 223 disposed behind the second pair of steps 222. In addition, an average height of the first pair of steps 221 may be lower than an average height of the second pair of steps 222, and the average height of the second pair of steps 222 may be lower than an average height of the third pair of steps 223. The first pair of steps 221 may include a third step 2211 and a fourth step 2212, and the third step 2211 may be positioned before the fourth step 2212 and may have a higher height. The second pair of steps 222 may include a fifth step 2221 and a sixth step 2222, and the fifth step 2221 may be positioned before the sixth step 2222 and may have a higher height. The third pair of steps 223 may include a seventh step 2231 and an eighth step 2232, and the seventh step 2231 may be positioned before the eighth step 2232 and may have a higher height. The third step 2211, the fifth step 2221, and the seventh step 2231 are disposed before the fourth step 2212, the sixth step 2222, and the eight step 2232, respectively, and thus, an HOM may be canceled and reduced without a change in the default mode.

The third stepped portion 230 may be configured to have a higher height than the second stepped portion 220, at least one step may be provided to form the third stepped portion, and steps of the third stepped portion 230 may be arranged from front to back in an increasing order of step heights. As illustrated in FIG. 2, the third stepped portion 230 may include a ninth step and may include not only a single step but also one or more steps. In addition, a condition that heights need to increase from front to back may need to be satisfied.

Referring to FIGS. 1 and 3, the septum polarizer 10 according to an embodiment may include the waveguide body 100 having a polygonal cross-section, the stepped septum 200 disposed in the longitudinal direction inside the waveguide body 100 and configured to divide the waveguide body 100 into two parts, and a corrugated portion 300 disposed on an outer surface of the waveguide body 100. Since the waveguide body 100 and the septum 200 are the same as the above-described waveguide body and the septum, the waveguide body 100 and the septum 200 will be briefly described.

The corrugated portion 300 may be disposed on a surface of the waveguide body 100 outside the septum 200 and may be disposed on a surface of the waveguide body 100 that does not meet the septum 200. As illustrated in FIG. 1, the corrugated portion 300 may be disposed on the outer surface of the waveguide body 100 that does not contact the septum 200. Specifically, the corrugated portion 300 may be disposed on the outer surface of the waveguide body 100 parallel to a longitudinal plane (a YZ plane) of the septum 200. In addition, depending on a design, the corrugated portion 300 may be further disposed on a second surface (a surface parallel to an XZ plane) of the waveguide body 100 close to the septum 200 in addition to the previously disposed corrugated portion 300.

The septum 200 may include n steps of different heights, and the corrugated portion 300 may have n+1 steps. As illustrated in FIG. 3, the septum 200 may include 9 steps of different heights, and the corrugated portion 300 may have 10 steps, one more than 9 steps. Here, the number of corrugated portions 300 may be defined as the number of corrugated portions 300 in a cross-section cut in a longitudinal direction of the waveguide body 100.

As illustrated in FIG. 3, the corrugated portion 300 may include a first step 301, a second step 302, a third step 303, a fourth step 304, a fifth step 305, a sixth step 306, a seventh step 307, an eighth step 308, a ninth step 309, and a tenth step 310. Depending on the design, the number of corrugated portions may vary according to a number of steps of the septum. For example, when the number of steps of the septum is 11, the number of corrugated portions may be designed to be 12.

Neighboring steps of the corrugated portion 300 may be formed with different heights, widths, or depths. Specifically, a height may be a dimension on a Y-axis, a width may be a dimension on a Z-axis, and a depth may be a dimension on an X-axis. The steps of the corrugated portion 300 illustrated in FIG. 1 are configured to have the same height, but the corrugated portion may include steps of different heights. As illustrated in FIG. 3, the first step 301 and the third step 303, each adjacent to the second step 302, may be formed to have different widths or lengths from the second step 302, and the other steps may also be formed to have different widths or depths from their adjacent steps.

Accordingly, the septum polarizer 10 may have the septum 200 including the first stepped portion 210, the second stepped portion 220, and the third stepped portion 230 of different heights, and the corrugated portion 300, thereby reducing an HOM in a preset frequency band, such as a Ka-band.

Hereinafter, performance of the septum polarizer 10 according to an embodiment is described in detail with reference to FIGS. 4A to 5C.

Figure 4A:
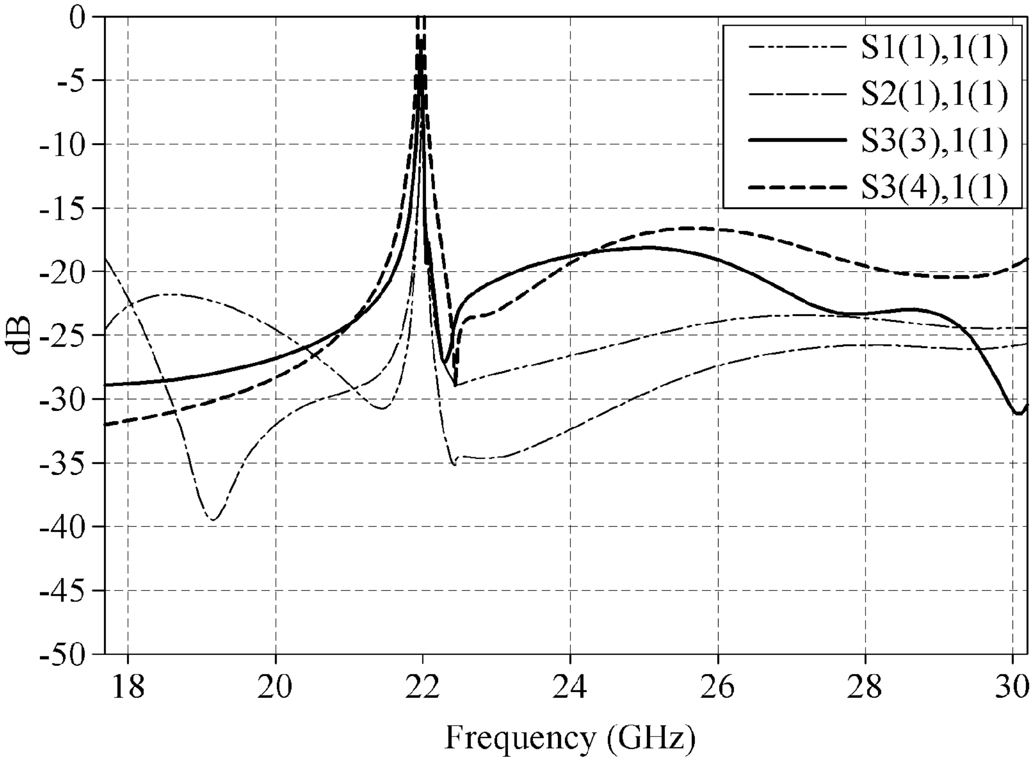
FIGS. 4A and 4B are graphs showing results of a decibel (dB) test in a preset frequency band of a septum polarizer according to an embodiment.
Figure 4B:
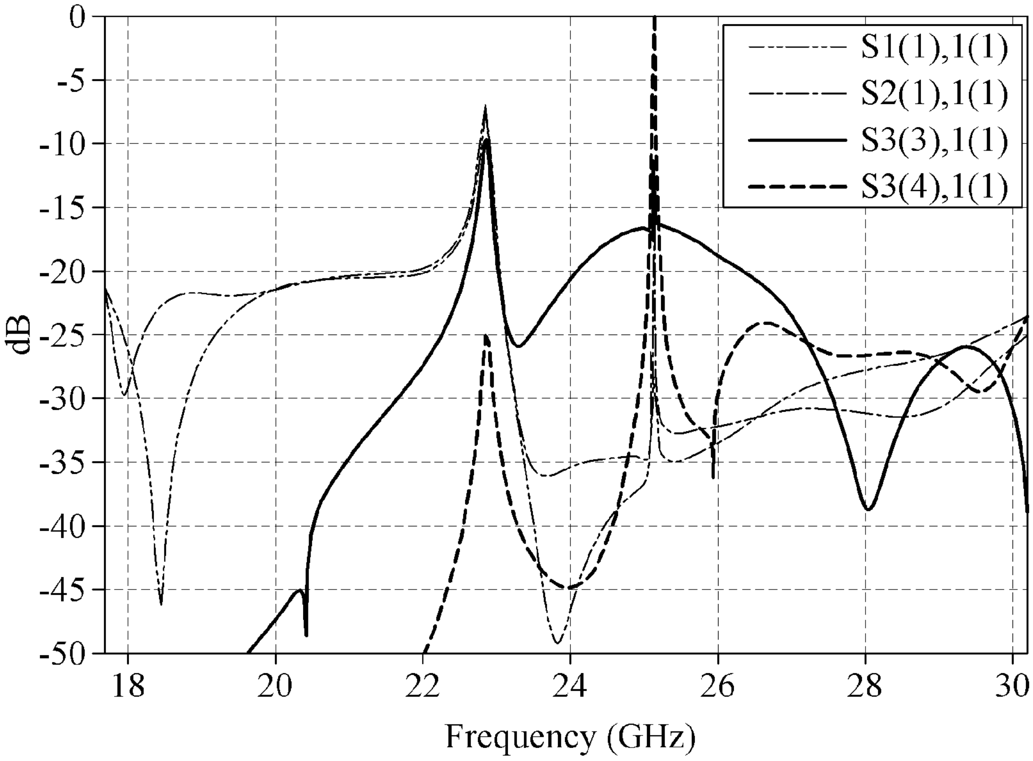
Figure 5A:
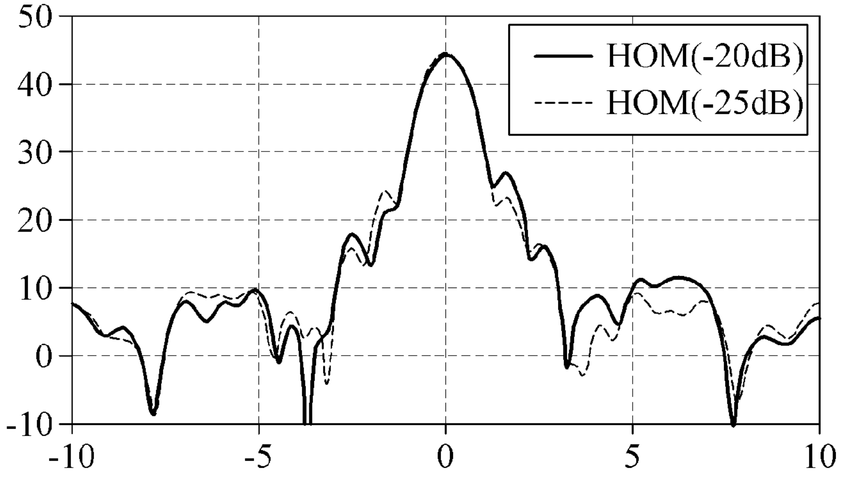
FIGS. 5A to 5C are graphs showing results of pattern data based on a decibel of a septum polarizer according to an embodiment.
Figure 5B:
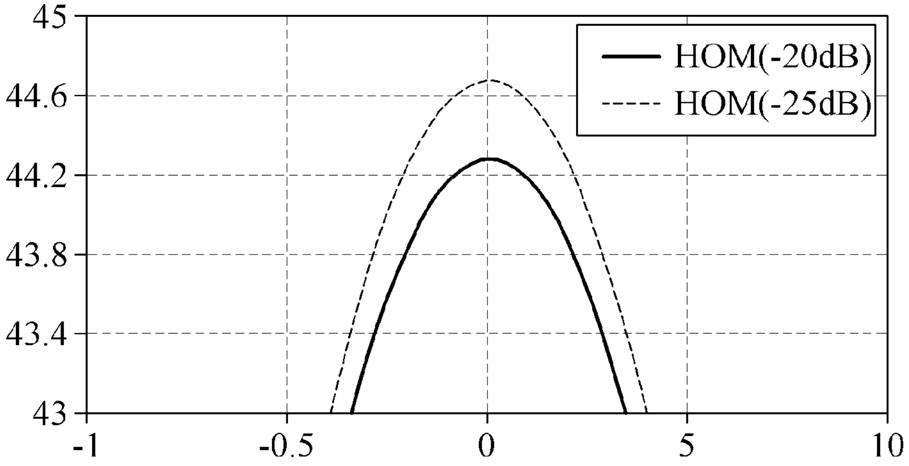
Figure 5C:
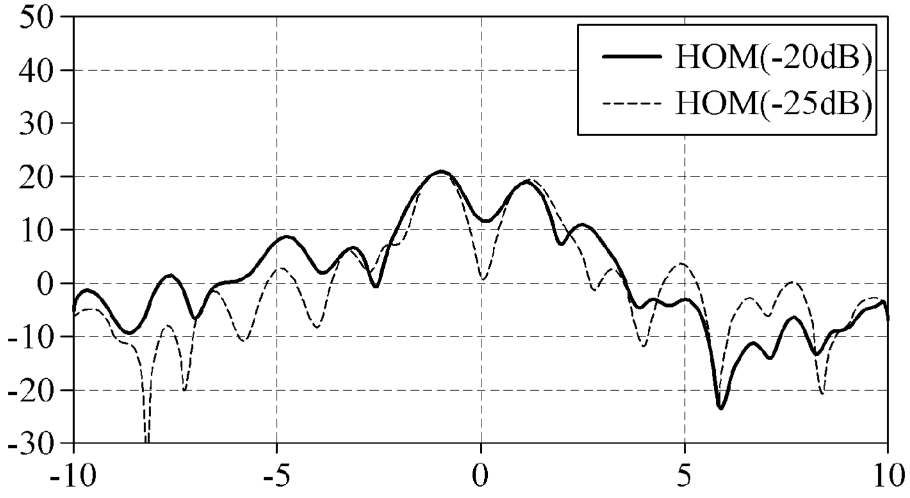

FIGS. 4A and 4B are graphs showing results of a decibel (dB) test in a preset frequency band of the septum polarizer 10 according to an embodiment, and FIGS. 5A to 5C are graphs showing results of pattern data based on a decibel of the septum polarizer 10 according to an embodiment.

Referring to FIGS. 4A and 4B, FIG. 4A is a graph showing results of a test conducted on a general septum polarizer. That is, unlike the septum polarizer 10, the general septum polarizer is a polarizer in which a height of a septum increases in a predetermined direction. In addition, the general septum polarizer described herein does not include a corrugated portion. FIG. 4B is a graph showing results of a test conducted on the septum polarizer 10.

A receiving band of 17.7 to 20.2 gigahertz (GHz) and a transmitting band of 27.5 to 30.0 GHz are used as frequencies to describe the embodiments of FIGS. 4A and 4B. In addition, "S1(1),1(1)" means a return loss, and "S2(1),1(1)" means port-to-port isolation (hereinafter, referred to as "isolation"), and the return loss and the isolation correspond to a default mode. Also, "S3(3),1(1)" and "S3(4),1(1)" mean TM11 and TE11, respectively, and they correspond to an HOM.

Referring to FIG. 4A, the general septum polarizer may have a return loss less than or equal to −22 dB and isolation less than or equal to −20 dB in a receiving band and have a return loss less than or equal to −23 dB and isolation less than or equal to −26 dB in a transmitting band. In addition, the general septum polarizer may have TM11 less than or equal to −23 dB and TE11 less than or equal to −19 dB in the transmitting band.

Referring to FIG. 4B, the septum polarizer 10 may have a return loss less than or equal to −22 dB and isolation less than or equal to −21 dB in a receiving band and have a return loss less than or equal to −24 dB and isolation less than equal to −26 dB in a transmitting band. In addition, the septum polarizer 10 may have TM11 less than or equal to −26 dB and TE11 less than or equal to −26 dB in the transmitting band.

The default mode values shown in FIG. 4A and the default mode values shown in FIG. 4B are almost similar, but the septum polarizer 10 has lower HOM values at the frequencies in the transmitting band. Thus, the septum polarizer 10 may have better performance than the general septum polarizer. Here, a lower HOM value indicates good performance. As illustrated in FIG. 4B, at frequencies below around 20.4 GHz in the transmitting band, an HOM may not occur because it is cut off.

Referring to FIGS. 5A to 5C, in each of FIGS. 5A, 5B, and 5C, a solid line may represent pattern data (hereinafter, referred to as "pattern data to which the general septum polarizer is applied") of a parabolic antenna to which a general septum polarizer is applied, and a broken line may represent pattern data (hereinafter, referred to as "pattern data to which the septum polarizer 10 is applied") of a parabolic antenna to which the septum polarizer 10 is applied. The pattern data to which the general septum polarizer is applied is measured when an HOM level is at about −20 dB in the transmitting band as illustrated in FIG. 4A, and the pattern data to which the septum polarizer 10 is applied is measured when an HOM level is at about −25 dB as illustrated in FIG. 4B. The type of the pattern data of the parabolic antenna may include a Co-pol pattern and an X-pol pattern.

FIG. 5A illustrates a Co-pol pattern, FIG. 5B illustrates an enlarged main beam of the Co-pol pattern, and FIG. 5C illustrates an X-pol pattern. In FIG. 5A, a Co-pol pattern to which the general septum polarizer is applied may be more asymmetrical than a Co-pol pattern to which the septum polarizer 10 is applied and may overshoot by about 3 dB or more. In other words, the Co-pol pattern to which the septum polarizer 10 is applied is more symmetrical than the Co-pol pattern to which the general septum polarizer is applied. In this case, an HOM is reduced and the Co-pol pattern is improved, and, accordingly, the septum polarizer 10 may achieve relatively better performance than the general septum polarizer. FIG. 5B illustrates that a peak level of the Co-pol pattern to which the general septum polarizer is applied is lower by about 0.4 dB than a peak level of the Co-pol pattern to which the septum polarizer 10 is applied. This may represent that a signal level is reduced by an HOM when the general septum polarizer is applied. FIG. 5C illustrates that an X-pol pattern to which the septum polarizer 10 is applied is more symmetrical than an X-pol pattern to which the general septum polarizer is applied and that an HOM is reduced. Referring to FIGS. 5A to 5C, a symmetrical pattern may indicate improved performance achieved by a reduction in HOM.

When wideband satellite communication is performed with the general septum polarizer, a Co-pol pattern and a Cross-pol pattern of an antenna may be distorted by an HOM that occurs in a relatively higher frequency band among using frequency bands, resulting in the Co-pol pattern and the Cross-pol pattern being asymmetrical. Accordingly, a sidelobe level corresponding to an arbitrary angle may increase, causing interference to an adjacent satellite, but contrary to this, an HOM level of a predetermined frequency may increase, reducing a signal level of the frequency. In addition, although the general septum polarizer is compact and has an excellent axial ratio characteristic, the general septum is not suitable for wideband communication and may allow limited use of frequencies. Thus, the septum polarizer 10, together with the effects described below, may supplement and improve the general septum polarizer.

Accordingly, by using the septum polarizer 10 according to an embodiment, it may be possible to guarantee smooth communication characteristics by reducing or suppressing an HOM, such as TM11 and TE11, that occurs in a relatively higher frequency band rather than a lower frequency band (in general, a lower frequency band of a satellite earth station antenna is used as a receiving band and a relatively higher frequency band is used as a transmitting band) when Ka-Band satellite communication, which is representative wideband communication, is performed.

In addition, by using the septum polarizer 10 according to an embodiment, it may be possible to reduce adjacent satellite interference caused by a sidelobe and prevent reduction in antenna gain due to an HOM by reducing distortion of Co-pol and Cross-pol beam patterns of an antenna and increasing symmetry by suppressing an HOM of the septum polarizer.

Furthermore, by using the septum polarizer 10 according to an embodiment, an HOM may be reduced without deterioration of characteristics of a default mode such as an axial ration, a return loss, and isolation.

Although the embodiments have been described with reference to the limited drawings, one of ordinary skill in the art may apply various technical modifications and variations based thereon. For example, suitable results may be achieved if the described techniques are performed in a different order and/or if components in a described system, architecture, device, or circuit are combined in a different manner or replaced or supplemented by other components or their equivalents.

Therefore, other implementations, other embodiments, and equivalents to the claims are also within the scope of the following claims.

The invention claimed is:

1. A septum polarizer comprising:

a waveguide body; and a stepped septum disposed in a longitudinal direction inside the waveguide body and configured to divide the waveguide body into two parts, wherein:

the septum polarizer comprises stepped portions of different heights to reduce a higher order mode in a preset frequency band, a first stepped portion is disposed on a front side of the waveguide body, a second stepped portion is disposed after the first stepped portion and configured to reduce a higher order mode, the second stepped portion includes at least one pair of steps, the pair of steps comprise at least two steps of different heights, among the at least two steps, a step with a higher height is disposed before a step with a lower height, the at least one pair of steps includes a first pair of steps disposed on a front side of the second stepped portion and a second pair of steps disposed after the first pair of steps, and an average height of the first pair of steps is lower than an average height of the second pair of steps.

2. The septum polarizer of claim 1, wherein the stepped septum comprises a third stepped portion disposed after of the second stepped portion and disposed to face the first stepped portion.

3. The septum polarizer of claim 2, wherein the third stepped portion is configured to have a higher height than the second stepped portion, at least one step is provided to form the third stepped portion, and steps of the third stepped portion are arranged from front to back in an increasing order of step heights.

4. The septum polarizer of claim 1, wherein the first stepped portion comprises at least one step, and steps of the first stepped portion are formed with different heights and arranged from front to back in an increasing order of step heights.

5. The septum polarizer of claim 1, wherein the second stepped portion has a higher height than the first stepped portion.

6. The septum polarizer of claim 1, wherein the second stepped portion further comprises a third pair of steps disposed after the second pair of steps, and the average height of the second pair of steps is lower than an average height of the third pair of steps.

7. A septum polarizer of claim 1 comprising:

a waveguide body having a polygonal cross-section; and a corrugated portion disposed on an outer surface of the waveguide body.

8. The septum polarizer of claim 7, wherein the corrugated portion is disposed on a surface of the waveguide body outside the stepped septum, and the corrugated portion is disposed on a surface of the waveguide body that does not meet the stepped septum.

9. The septum polarizer of claim 7, wherein the stepped septum comprises n steps of different heights along an entire length of the stepped septum, and an entire span of the corrugated portion comprises a total number of n+1 steps.

10. The septum polarizer of claim 9, wherein neighboring steps of the corrugated portion are formed with different heights, widths, or depths.

* * * * *